US008525764B2

(12) United States Patent
Liou et al.

(10) Patent No.: US 8,525,764 B2
(45) Date of Patent: Sep. 3, 2013

(54) LIQUID CRYSTAL DISPLAY PANEL WITH FUNCTION OF COMPENSATING FEED-THROUGH EFFECT

(75) Inventors: Fu-Yuan Liou, Hsin-Chu (TW); Shu-Huan Hsieh, Hsin-Chu (TW); Chung-Lung Li, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 175 days.

(21) Appl. No.: 12/948,715

(22) Filed: Nov. 17, 2010

(65) Prior Publication Data

US 2012/0062542 A1 Mar. 15, 2012

(30) Foreign Application Priority Data

Sep. 10, 2010 (TW) ................................ 99130627 A

(51) Int. Cl.
*G09G 3/36* (2006.01)
(52) U.S. Cl.
USPC .............................. 345/87; 345/92; 345/204
(58) Field of Classification Search
USPC ........................................... 345/87, 92, 204
See application file for complete search history.

(56) References Cited

U.S. PATENT DOCUMENTS

| 8,223,097 B2* | 7/2012 | Lin et al. ........................ 345/87 |
| 2006/0214895 A1* | 9/2006 | Shih et al. ..................... 345/88 |
| 2006/0256065 A1 | 11/2006 | Jung |
| 2007/0176874 A1* | 8/2007 | Yeh ................................ 345/92 |
| 2008/0024411 A1* | 1/2008 | Hsieh et al. .................... 345/89 |
| 2008/0174583 A1 | 7/2008 | Lee |
| 2009/0102991 A1* | 4/2009 | Chen et al. ..................... 349/33 |
| 2011/0032279 A1* | 2/2011 | Kim et al. .................... 345/690 |

* cited by examiner

Primary Examiner — Kwang-Su Yang
(74) Attorney, Agent, or Firm — Winston Hsu; Scott Margo

(57) ABSTRACT

An LCD panel with function of compensating feed-through effect includes plural groups of pixels, a gate-driving circuit, a data-driving circuit, and a gamma voltage generator. Each group of pixels includes first pixel and second pixel. The first pixel and the second pixel share a data line, and are respectively coupled to first gate line and second gate line. When the gate-driving circuit drives the first gate line, the gamma voltage generator provides un-compensated gamma voltages for the data-driving circuit writing data to the first pixel. When the gate-driving circuit drives the first and the second gate lines at the same time, the gamma voltage generator provides gamma voltages compensated by a compensating voltage level for the data-driving circuit writing data to the second pixel. In this way, the feed-through effect suffered by the second pixel is compensated, so that each pixel of the LCD panel can display with correct brightness.

7 Claims, 8 Drawing Sheets

LIQUID CRYSTAL DISPLAY PANEL WITH FUNCTION OF COMPENSATING FEED-THROUGH EFFECT

BACKGROUND OF THE INVENTION

1. Field of the Invention

The present invention is related to a liquid crystal display (LCD), and more particularly, to an LCD panel with function of compensating feed-through effect.

2. Description of the Prior Art

In an LCD panel, when a gate-driving circuit drives a gate line, a data-driving circuit can write data into pixels coupled to the gate line through a data line. However, when the gate-driving circuit stops driving the gate line, the pixels coupled to the gate line suffer the feed-through effect. More particularly, the data stored in the pixels coupled to the gate line are affected by the falling edge of the voltage on the gate line, so that all of the voltage levels of the data stored in the pixels decreases by one feed-through voltage level. In this way, the LCD panel can not display with correct brightness.

SUMMARY OF THE INVENTION

The present invention provides a liquid crystal display (LCD) panel with function of compensating feed-through effect. The LCD panel comprises plural groups of pixels, a gate-driving circuit, a data-driving circuit, and a gamma voltage generator. Each group of plural groups of the pixels comprises a first pixel, and a second pixel. The first pixel comprises a first transistor, a first storage capacitor, and a first liquid capacitor. The first transistor has a first end coupled to a data line, a second end, and a control end coupled to a first gate line. The first storage capacitor and the first liquid capacitor are coupled between a common voltage source and the second end of the first transistor. The second pixel comprises a second transistor, a second storage capacitor, and a second liquid capacitor. The second transistor has a first end coupled to the second end of the first transistor, a second end, and a control end coupled to a second gate line. The second storage capacitor and the second liquid capacitor are coupled between the common voltage source and the second end of the second transistor. The gate-driving circuit is utilized for driving the first gate line and the second gate line. When the gate-driving circuit drives the first gate line, the data-driving circuit writes a first data into the first pixel through the data line and the first transistor. When the gate-driving circuit drives the first gate line and the second gate line, the data-driving circuit writes a second data into the second pixel through the data line, the first transistor, and the second transistor. The gamma voltage generator is utilized for providing a first group of gamma voltages to the data-driving circuit. The gamma voltage generator comprises a first voltage-dividing circuit, a first switch circuit, a second switch circuit, and a control circuit. The first voltage-dividing circuit is coupled between a first node and a second node. The first voltage-dividing circuit is utilized for generating the first group of gamma voltages according to a first voltage on the first node and a second voltage on the second node. Voltage levels of the first group of gamma voltages are between voltage levels of the first voltage and the second voltage. The first switch circuit is coupled to the first node. The second switch circuit is coupled to the second node. The control circuit is utilized for controlling the first switch circuit to switch the first voltage to a first predetermined voltage level when the data-driving circuit writes the first data, and controlling the second switch circuit to switch the second voltage to a predetermined high voltage level or a predetermined low voltage level according to polarity of the first data. When the data-driving circuit writes the second data, the control circuit controls the first switch circuit to switch the first voltage to the first predetermined voltage level or the first predetermined voltage level plus a compensating voltage level and controls the second switch circuit to switch the second voltage to the predetermined high voltage level or the predetermined low voltage level plus the compensating voltage level, according to polarity of the second data.

The present invention further provides a liquid crystal display (LCD) panel with function of compensating feed-through effect. The LCD panel comprises plural groups of pixels, a gate-driving circuit, a data-driving circuit, and a gamma voltage generator. Each group of plural groups of the pixels comprises a first pixel, and a second pixel. The first pixel comprises a first transistor, a first storage capacitor, and a first liquid capacitor. The first transistor has a first end coupled to a data line, a second end, and a control end coupled to a first gate line. The first storage capacitor and the first liquid capacitor are coupled between a common voltage source and the second end of the first transistor. The second pixel comprises a second transistor, a second storage capacitor, and a second liquid capacitor. The second transistor has a first end coupled to the second end of the first transistor, a second end, and a control end coupled to a second gate line. The second storage capacitor and the second liquid capacitor are coupled between the common voltage source and the second end of the second transistor. The gate-driving circuit is utilized for driving the first gate line and the second gate line. When the gate-driving circuit drives the first gate line, the data-driving circuit writes a first data into the first pixel through the data line and the first transistor. When the gate-driving circuit drives the first gate line and the second gate line, the data-driving circuit writes a second data into the second pixel through the data line, the first transistor, and the second transistor. The gamma voltage generator is utilized for providing a group of positive polarity gamma voltages and a group of negative polarity gamma voltages to the data-driving circuit. The gamma voltage generator comprises a first voltage-dividing circuit, a first switch circuit, a second voltage-dividing circuit, a second switch circuit, and a control circuit. The first voltage-dividing circuit is coupled between a first node and a second node. The first voltage-dividing circuit is utilized for generating the group of positive polarity gamma voltages according to a first voltage on the first node and a second voltage on the second node. Voltage levels of the group of positive polarity gamma voltages are between voltage levels of the first voltage and the second voltage. The voltage level of the second voltage is equal to a predetermined high voltage level. The first switch circuit is coupled to the first node. The second voltage-dividing circuit is coupled between a third node and a fourth node. The second voltage-dividing circuit is utilized for generating the group of negative polarity gamma voltages according to a third voltage on the third node and a fourth voltage on the fourth node. Voltage levels of the group of negative polarity gamma voltages are between voltage levels of the third voltage and the fourth voltage. The voltage level of the third voltage is equal to a first predetermined voltage level. The second switch circuit is coupled to the fourth node. The control circuit is utilized for controlling the first switch circuit to switch the first voltage to the first predetermined voltage level and controlling the second switch circuit to switch the fourth voltage to a predetermined low voltage level when the data-driving circuit writes the first data. When the data-driving circuit writes the second data, the control circuit controls the first switch circuit to switch the first voltage to the first predetermined voltage level plus a compensating voltage level, and controls the second switch circuit to switch the fourth voltage to the predetermined low voltage level plus the compensating voltage level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
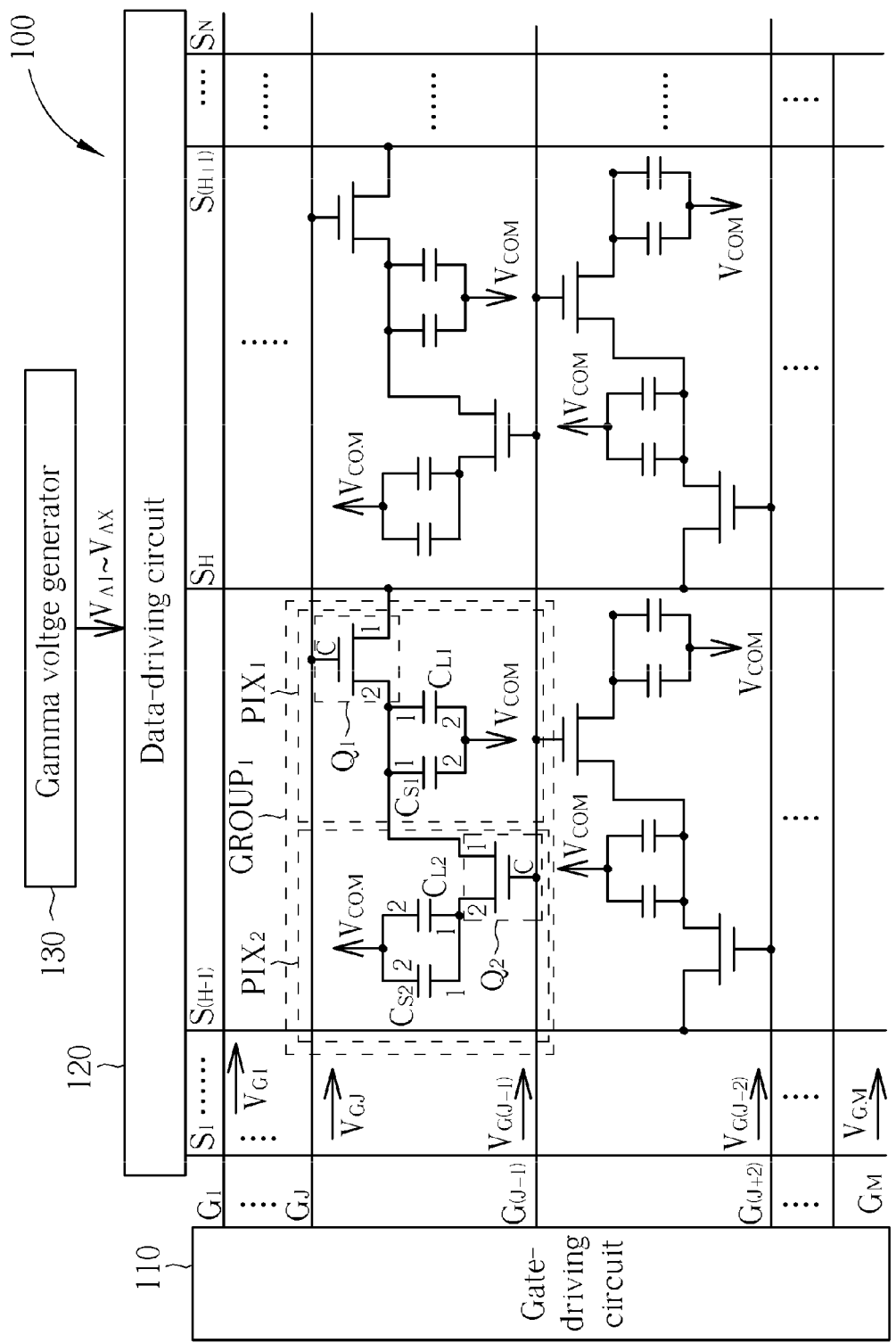
FIG. 1 is a diagram illustrating an LCD panel having a half-source-driving structure.

Please refer to FIG. 1. FIG. 1 is a diagram illustrating an LCD panel 100 having a half-source-driving structure. The LCD panel 100 includes plural groups of pixels, a gate-driving circuit 110, a data-driving circuit 120, and a gamma voltage generator 130. Each group of pixels has similar structure. Take the first group of pixels $GROUP_1$ as an example for illustration. The first group $GROUP_1$ of pixels includes pixels $PIX_1$ and $PIX_2$. The pixel $PIX_1$ includes a transistor $Q_1$, a storage capacitor $C_{S1}$ and a liquid crystal capacitor $C_{L1}$. The transistor $Q_1$ includes a first end (1) coupled to a data line $S_H$, a second end (2), and a control end (C) coupled to a gate line $G_J$. The storage capacitor $C_{S1}$ includes a first end (1) coupled to the second end of the transistor $Q_1$, and a second end (2) coupled to a common voltage source $V_{COM}$. The liquid crystal capacitor $C_L$ also includes a first end (1) coupled to the second end of the transistor $Q_1$, and a second end (2) coupled to a common voltage source $V_{COM}$. The gate-driving circuit 110 is utilized for providing gate-driving signals to gate lines $G_1$~$G_M$. $V_{G1}$~$V_{GM}$ represent voltages on the gate lines $G_1$~$G_M$, respectively. The gamma voltage generator 130 is utilized for providing gamma voltages $V_{A1}$~$V_{AX}$ to data-driving circuit 120. The data-driving circuit 120 is utilized for writing data into the pixels in LCD panel 100 through data lines $S_1$~$S_N$ according to the gamma voltages $V_{A1}$~$V_{AX}$.

Figure 2:
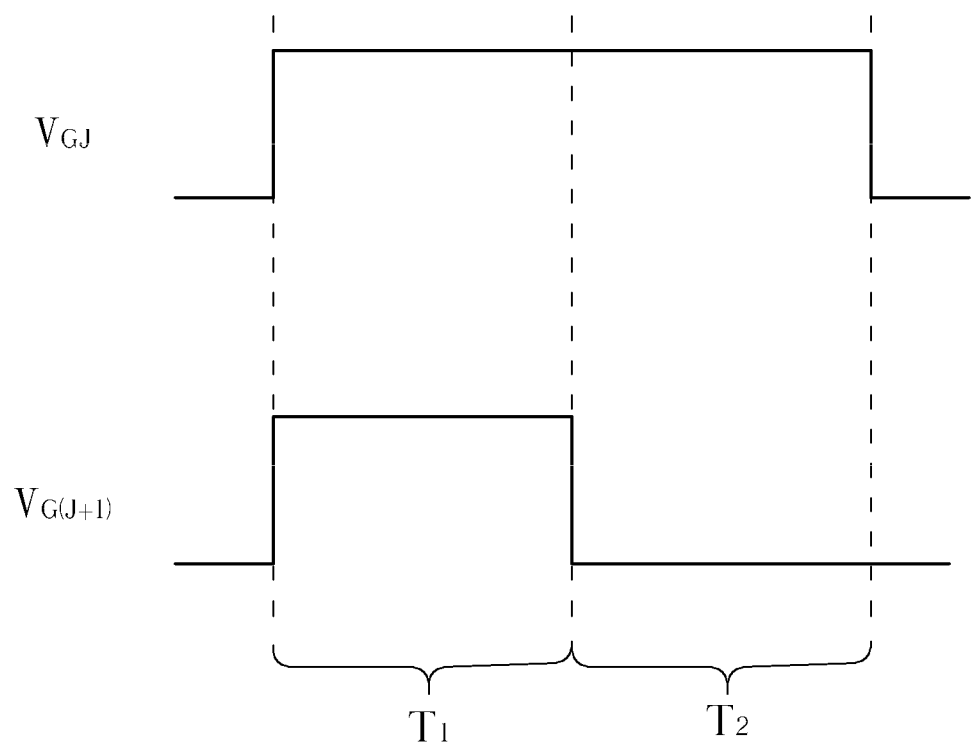
FIG. 2 is a diagram illustrating the driving method of the LCD panel of FIG. 1.

Please refer to FIG. 2. FIG. 2 is a diagram illustrating the driving method of the LCD panel 100. In the period $T_1$ of FIG. 2, the gate-driving circuit 110 provides the gate-driving signals to the gate lines $G_J$ and $G_{(J+1)}$, so that the transistors $Q_1$ and $Q_2$ are both turned on. In this way, the data-driving circuit 120 charges the storage capacitor $C_{S2}$ through the data line $S_H$, and the transistors $Q_1$ and $Q_2$. In other words, the data-driving circuit 120 writes data into the pixel $PIX_2$, wherein the data written into the pixel $PIX_2$ is called "the second data" hereinafter. In the period $T_2$ of FIG. 2, the gate-driving circuit 110 only provides the gate-driving signal to the gate line $G_J$, so that the transistor $Q_1$ is turned on and the transistor $Q_2$ is turned off. In this way, the data-driving circuit 120 charges the storage capacitor $C_{S1}$ through the data line $S_H$ and the transistor $Q_1$. In other words, the data-driving circuit 120 writes data into the pixel $PIX_1$, wherein the data written into the pixel $PIX_1$ is called "the first data" hereinafter. It can be seen according to the above illustration that the pixels $PIX_1$ and $PIX_2$ can share one data line $S_H$ by means of the driving method illustrated in FIG. 2. Hence, compared with conventional LCD panel, in the LCD panel 100 having the half-source-driving structure, the number of data lines is reduced.

Figure 3:
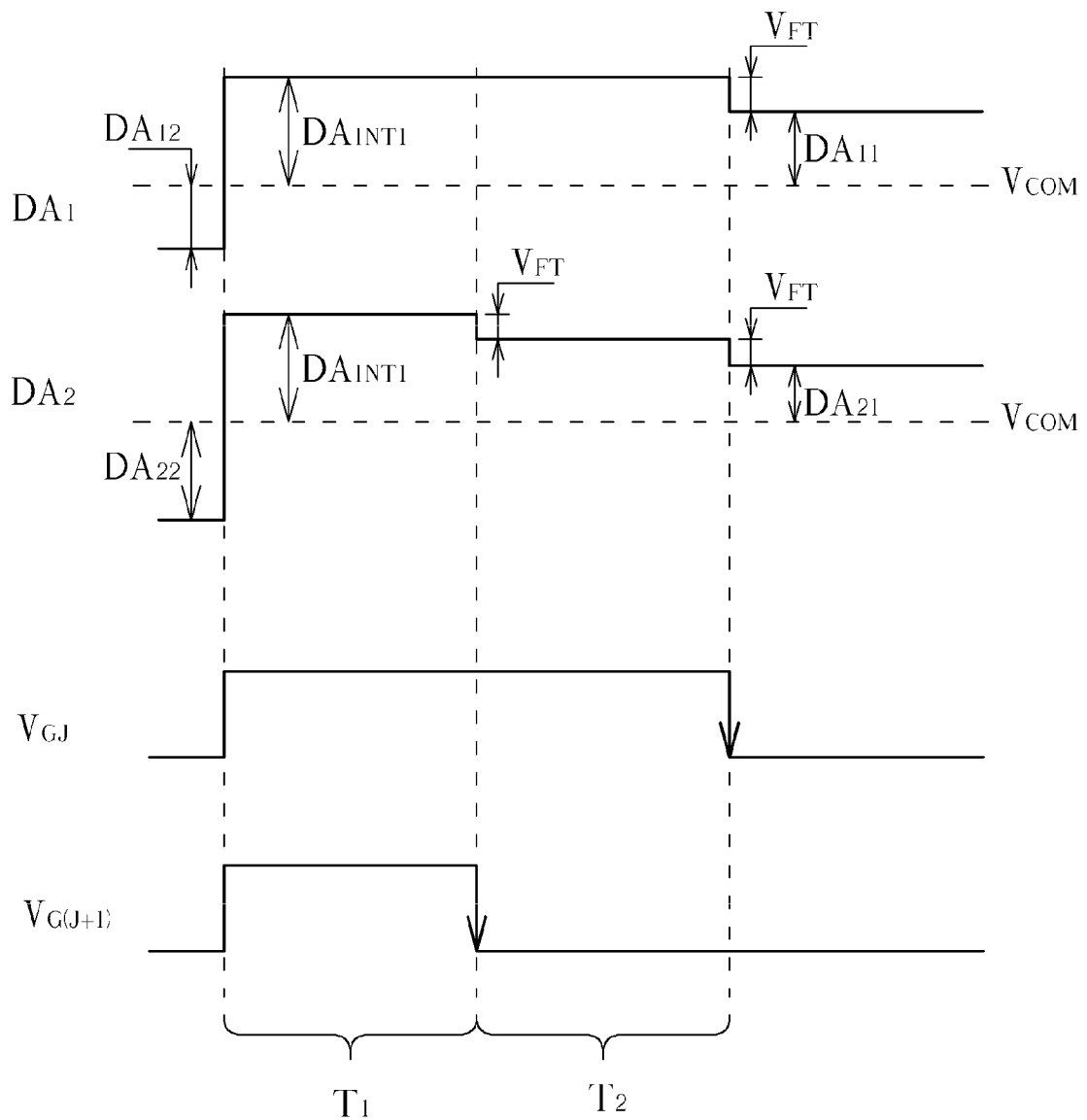
FIG. 3 and FIG. 4 are diagrams illustrating the feed-through effect suffered by the LCD panel of FIG. 1.
Figure 4:
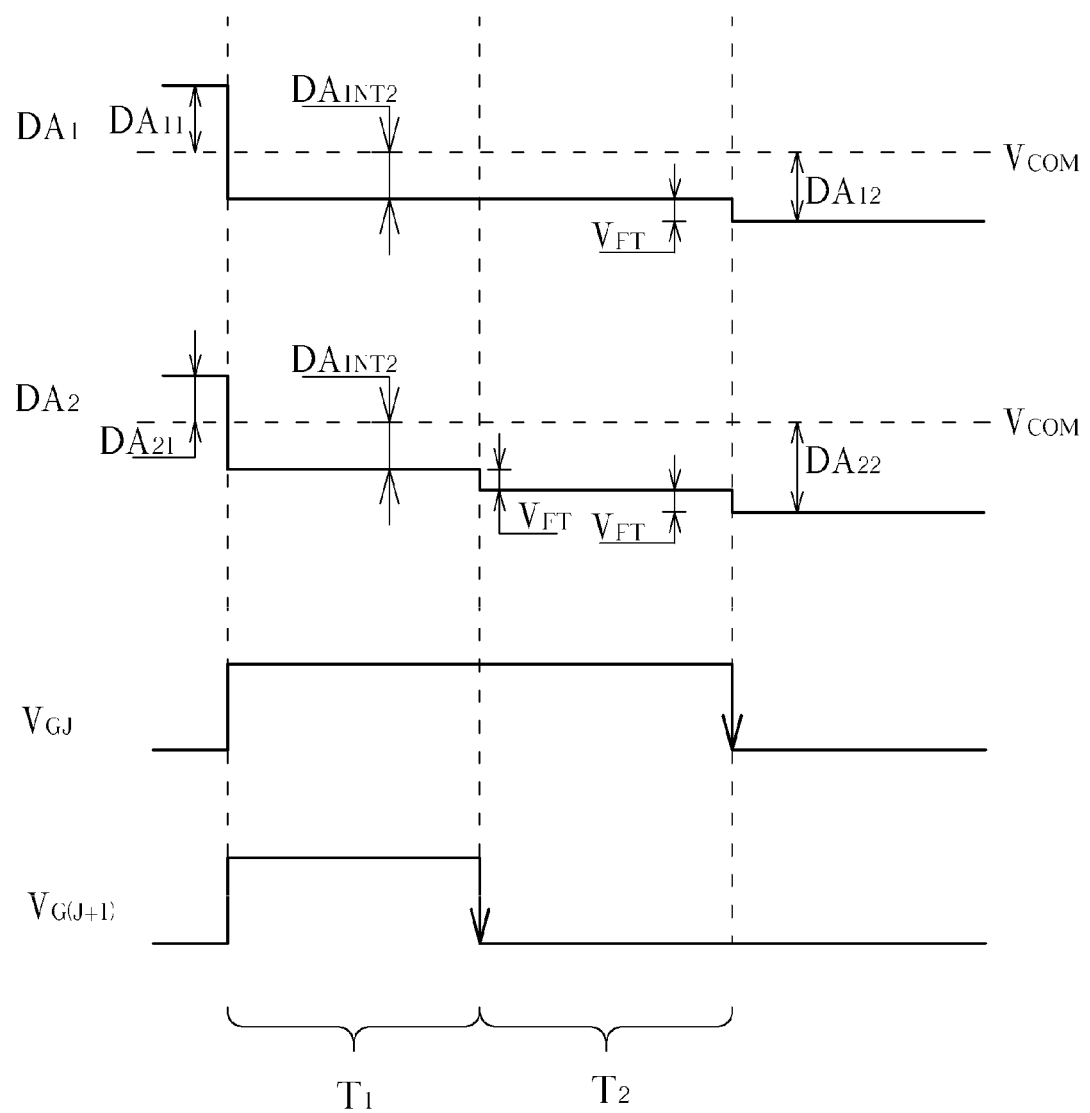

Please refer to FIG. 3 and FIG. 4. FIG. 3 and FIG. 4 are diagrams illustrating the feed-through effect suffered by the LCD panel 100. In FIG. 3 and FIG. 4, it is assumed that the type of the polarity inversion of the LCD panel 100 is frame inversion, and the common voltage source $V_{COM}$ provides a DC common voltage $V_{COM}$. $DA_1$ represents the data stored by the pixel $PIX_1$. $DA_2$ represents the data stored by the pixel $PIX_2$. FIG. 3 shows the waveforms of the data-driving signals $V_{GJ}$ and $V_{G(J+1)}$, and the data $DA_1$ and $DA_2$ in an odd frame of the LCD panel 100. In FIG. 3 and FIG. 4, the first data written into the pixel $PIX_1$ and the second data written into the pixel $PIX_2$ are both equal to $DA_{INT1}$, and the data polarity of each pixel in the LCD panel 100 is positive. In period $T_1$ of FIG. 3, when the gate-driving circuit 110 drives the gate lines $G_J$ and $G_{(J+1)}$ at the same time, the data-driving circuit 120 writes the second data ($DA_{INT1}$) into the pixel $PIX_2$. When the LCD panel 100 enters the period $T_2$, the gate-driving circuit 110 only drives the gate line $G_J$. The voltage level of the data $DA_{INT1}$ stored in the pixel $PIX_2$ decreases by one feed-through voltage level $V_{FT}$ because the data $DA_{INT1}$ stored in the pixel $PIX_2$ is affected by the falling edge of the voltage $V_{G(J+1)}$ through the parasitic capacitor of the transistor $Q_2$. In the period $T_2$, the data-driving circuit 120 writes the first data ($DA_{INT1}$) to the pixel $PIX_1$. When the period $T_2$ is over, the voltage level of the data $DA_{INT1}$ stored in the pixel $PIX_1$ decreases by one feed-through voltage level $V_{FT}$ because the data $DA_{INT1}$ stored in the pixel $PIX_1$ is affected by the falling edge of the voltage $V_{GJ}$. In this way, the data stored in the pixel $PIX_2$ becomes $DA_{11}$. In addition, the voltage level of the data stored in the pixel $PIX_2$ is also affected by the falling edge of the voltage $V_{GJ}$ so that the voltage level of the data stored in the pixel $PIX_2$ decreases by one feed-through voltage level $V_{FT}$. Therefore, the data stored in the pixel $PIX_2$ becomes $DA_{21}$. It can be seen according to the above illustration that although the first data written by the data-driving circuit 120 into the pixel $PIX_1$ and the second data written by the data-driving circuit 120 into the pixel $PIX_2$ are both equal to $DA_{INT1}$, the data $DA_{21}$ stored in the pixel $PIX_2$ is not equal to the data $DA_{11}$ stored in the pixel $PIX_1$ because the pixel $PIX_2$ suffers the feed-through effect two times (that is, the voltage level of the data stored in the pixel $PIX_2$ decreases by $2V_{FT}$), but the pixel $PIX_2$ suffers the feed-through effect only one time (that is, the voltage level of the data stored in the pixel $PIX_1$ decreases only by $V_{FT}$). FIG. 4 shows the waveforms of the data-driving signals $V_{GJ}$ and $V_{G(J+1)}$, and the data $DA_1$ and $DA_2$ in an even frame of the LCD panel 100. The data polarity of each pixel of the LCD panel 100 is negative. Similarly, although the first data written by the data-driving circuit 120 into the pixel $PIX_1$ and the second data written by the data-driving circuit 120 into the pixel $PIX_2$ are both equal to $(-DA_{INT2})$, the data $(-DA_{22})$ stored in the pixel $PIX_2$ is not equal to the data $(-DA_{12})$ stored in the pixel $PIX_1$ because the pixel $PIX_2$ suffers the feed-through effect two times (that is, the voltage level of the data stored in the pixel $PIX_2$ decreases by $2V_{FT}$), but the pixel $PIX_2$ suffers the feed-through effect only one time (that is, the voltage level of the data stored in the pixel $PIX_1$ decreases only by $V_{FT}$).

It can be seen according to the above illustration that by means of the driving method illustrated in FIG. 2, the pixel $PIX_2$ suffers the feed-through effect two times and the pixel $PIX_2$ suffers the feed-through effect only one time. In other words, the pixels $PIX_1$ and $PIX_2$ suffer the feed-through effect with different degrees. Thus, even if the voltage levels of the gamma voltages $V_{A1}$~$V_{AX}$ provided by the gamma voltage generator 130 and the DC common voltage $V_{COM}$ are adjusted according to the feed-through effect suffered by the pixel $PIX_1$, the pixel $PIX_2$ still can not correctly store the data to display with correct brightness. That is, in the LCD panel 100, each pixel $PIX_2$ of each group of pixels can not display with correct brightness. In this way, the LCD panel 100 can not correctly display images.

Figure 5:
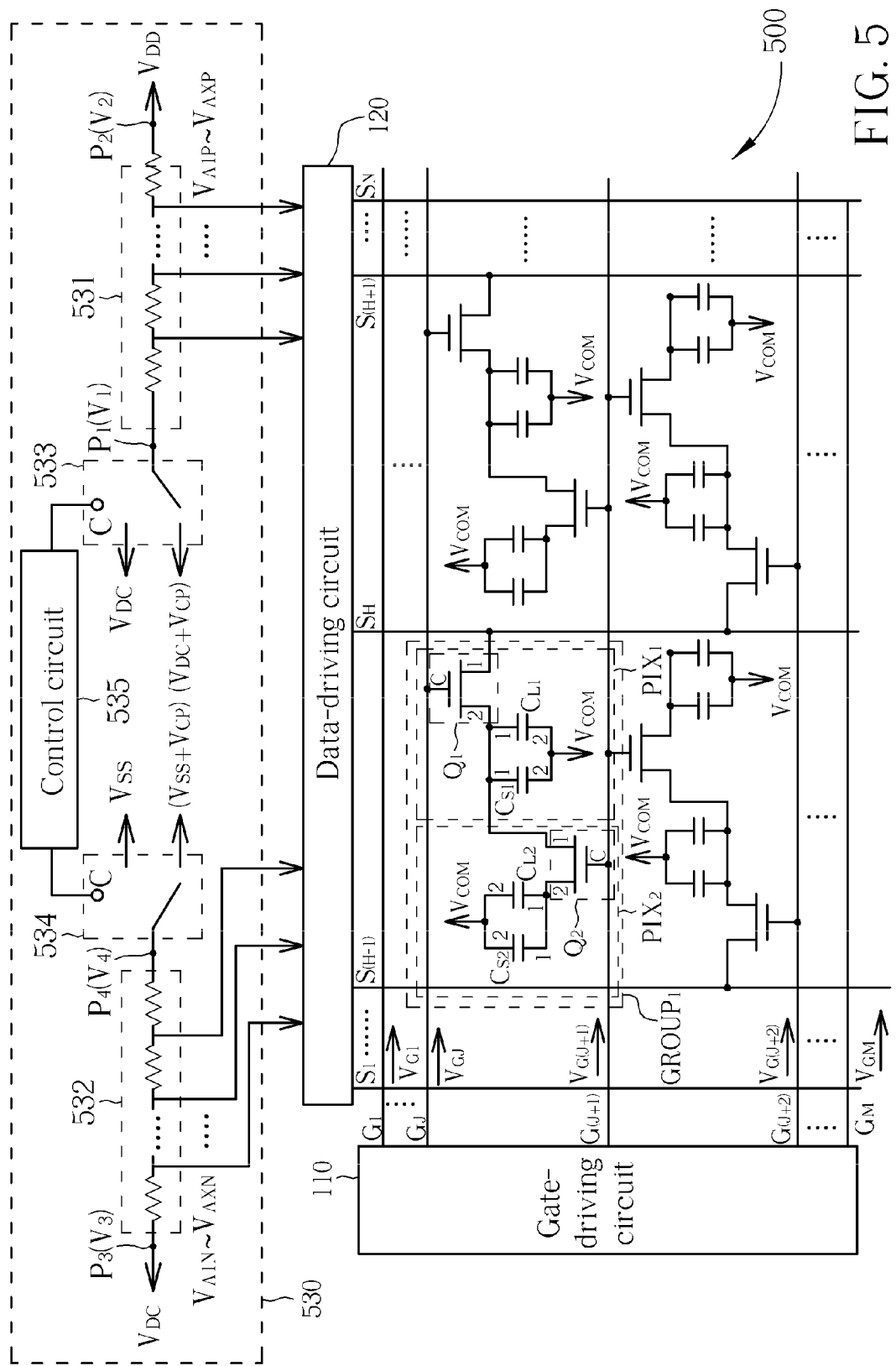
FIG. 5 is a diagram illustrating an LCD panel according to a first embodiment of the present invention.

Please refer to FIG. 5. FIG. 5 is a diagram illustrating an LCD panel 500 according to a first embodiment of the present invention. The LCD panel 500 has a half-source-driving structure. The LCD panel 500 includes plural groups of pixels, a gate-driving circuit 110, a data-driving circuit 120, and a gamma voltage generator 530. The structures of the plural groups of the pixels of the LCD panel 500 are similar to those of the LCD panel 100, and the driving method for the LCD panel is similar to the driving method illustrated in FIG. 2. In the LCD panel 500, the gamma generator 530 is utilized for providing a group of positive polarity gamma voltages $V_{A1N}$~$V_{AXN}$ and a group of negative polarity gamma voltages $V_{A1N}$~$V_{AXN}$ to the data-driving circuit 120. The gamma voltage generator 530 includes voltage-dividing circuits 531 and 532, switch circuits 533 and 534, and a control circuit 535. The voltage-diving circuit 531 includes a plurality of resistors coupled in series between nodes $P_1$ and $P_2$. The voltage-dividing circuit 531 generates the group of positive polarity gamma voltages $V_{A1P}$~$V_{AXP}$ according to a voltage $V_1$ on the node $P_1$ and a voltage $V_2$ on the node $P_2$, wherein voltage levels of the group of positive polarity gamma voltages $V_{A1P}$~$V_{AXP}$ are between voltage levels of the voltages $V_1$ and $V_2$. The voltage level of the voltage $V_2$ is equal to a predetermined high voltage level $V_{DD}$. The voltage-dividing circuit 532 includes a plurality of resistors coupled in series between nodes $P_3$ and $P_4$. The voltage-dividing circuit 532 generates the group of negative polarity gamma voltages $V_{A1N}$~$V_{AXN}$ according to a voltage $V_3$ on the node $P_3$ and the a voltage $V_4$ on the node $P_4$, wherein voltage levels of the group of negative polarity gamma voltages $V_{A1N}$~$V_{AXN}$ are between voltage levels of the voltages $V_3$ and $V_4$. The voltage level of the voltage $V_3$ is equal to a predetermined voltage level $V_{DC}$. The switch circuit 533 is coupled to the node $P_1$. The control end C of the switch circuit 533 is coupled to the control circuit 535. The switch circuit 533 is utilized for switching the voltage level of the voltage $V_1$ to be equal to the predetermined voltage level $V_{DC}$ or the predetermined voltage level $V_{DC}$ plus a compensating voltage level $V_{CP}$. The switch circuit 534 is coupled to the node P4. The control end C of the switch circuit 534 is coupled to the control circuit 535. The switch circuit 534 is utilized for switching the voltage level of the voltage $V_4$ to be equal to a predetermined low voltage level $V_{SS}$ or the predetermined low voltage level $V_{SS}$ plus the compensating voltage level $V_{CP}$. In the LCD panel 500, the compensating voltage level $V_{CP}$ is set to be equal to the feed-through voltage level $V_{FT}$. The voltage difference between the predetermined high voltage level $V_{DD}$ and the predetermined voltage level $V_{DC}$ is set to be equal to the voltage difference between the predetermined voltage level $V_{DC}$ and the predetermined low voltage level $V_{SS}$. When the common voltage source $V_{COM}$ provides a DC common voltage, the predetermined voltage level $V_{DC}$ is set to be equal to the voltage level of the DC common voltage. When the common voltage source $V_{COM}$ provides an AC common voltage, the predetermined voltage level $V_{DC}$ is set to be equal to the DC level of the AC common voltage. The control circuit 535 controls the switch circuits 533 and 534 to adjust the voltage levels of the positive polarity gamma voltages $V_{A1P}$~$V_{AXP}$ and the negative polarity gamma voltages $V_{A1N}$~$V_{AXN}$ according to whether the data-driving circuit 120 writes data into the pixels $PIX_1$ or $PIX_2$. In this way, both the pixels $PIX_1$ and $PIX_2$ can correctly display with correct brightness. The operational principle of the LCD panel 500 is further illustrated as below.

When the data-driving circuit 120 writes the first data into the pixel $PIX_1$, the control circuit 535 controls the switch circuit 533 to switch the voltage $V_1$ to the predetermined voltage level $V_{DC}$, and controls the switch circuit 534 to switch the voltage $V_4$ to the predetermined low voltage level $V_{SS}$. Hence, the voltage-dividing circuit 531 generates the positive polarity gamma voltages $V_{A1P}$~$V_{AXP}$ with voltage levels between $V_{DC}$ and $V_{DD}$, and the voltage-dividing circuit 532 generates the negative polarity gamma voltages $V_{A1N}$ $V_{AXN}$ with voltage levels between $V_{DC}$ and $V_{SS}$. When the data-driving circuit 120 writes the second data into the pixel $PIX_2$, the control circuit 535 controls the switch circuit 533 to switch the voltage $V_1$ to the voltage level ($V_{DC}$+$V_{CP}$), and controls the switch circuit 534 to switch the voltage $V_4$ to the voltage level ($V_{SS}$+$V_{CP}$). Therefore, the voltage-dividing circuit 531 generates the positive polarity gamma voltages $V_{A1P}$~$V_{AXP}$ with voltage levels between ($V_{DC}$+$V_{CP}$) and $V_{DD}$, and the voltage-dividing circuit 532 generates the negative polarity gamma voltages $V_{A1N}$~$V_{AXN}$ with voltage levels between $V_{DC}$ and ($V_{SS}$+$V_{CP}$). In other words, the voltage levels of the gamma voltages $V_{A1P}$~$V_{AXP}$ and $V_{A1N}$~$V_{AXN}$ generated by the gamma voltage generator 530 when the data-driving circuit 120 writes the second data into the pixel $PIX_2$ are higher than those generated by the gamma voltage generator 530 when the data-driving circuit 120 writes the first data into the pixel $PIX_1$ by one compensating voltage level $V_{CP}$. Since the compensating voltage level $V_{CP}$ is set to be equal to the feed-through voltage level $V_{FT}$, the gamma voltages $V_{A1P}$~$V_{AXP}$ and $V_{A1N}$~$V_{AXN}$ generated by the gamma voltage generator 530 when the data-driving circuit 120 writes the second data into the pixel $PIX_2$ can compensate the feed-through effect suffered by the pixel $PIX_2$. In this way, the pixels $PIX_1$ and $PIX_2$ of each group of pixels can display with correct brightness.

Figure 6:
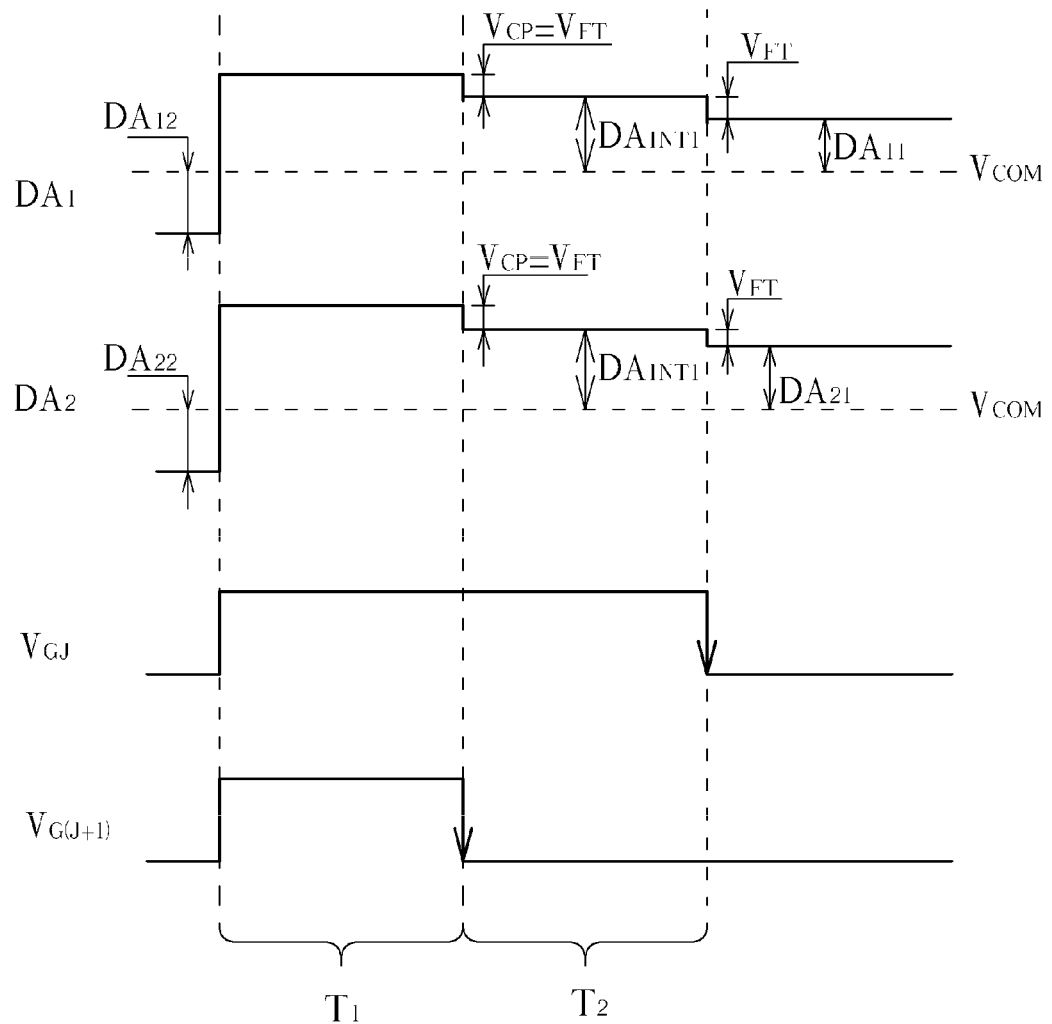
FIG. 6 and FIG. 7 are diagrams illustrating the LCD panel of FIG. 5 capable of displaying with correct brightness.
Figure 7:
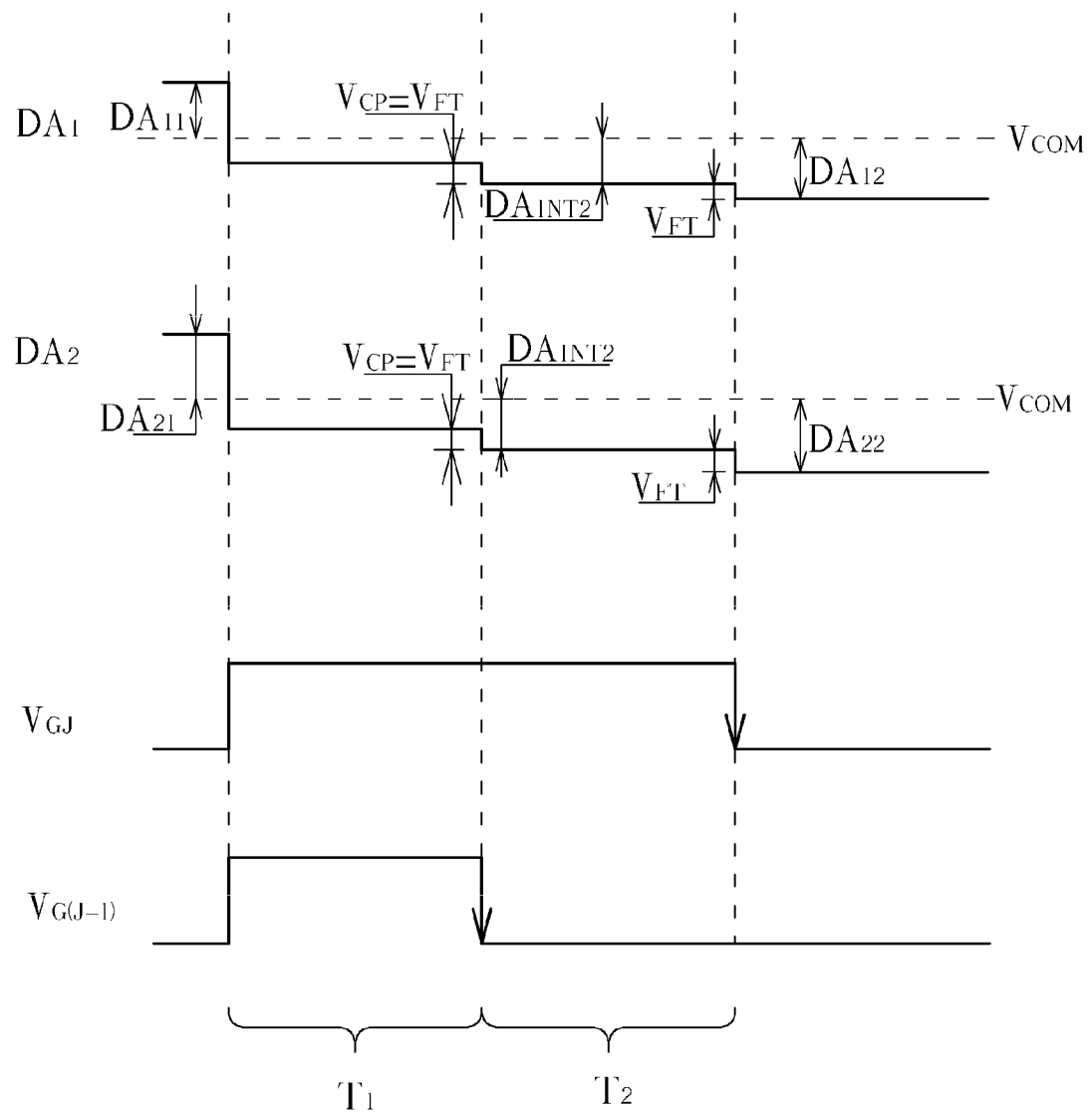

Please refer to FIG. 6 and FIG. 7. FIG. 6 and FIG. 7 are diagrams illustrating the LCD panel 500 capable of displaying with correct brightness. In FIG. 6 and FIG. 7, it is assumed that the type of the polarity inversion of the LCD panel 500 is frame inversion, and the common voltage source $V_{COM}$ provides a DC common voltage $V_{COM}$. $DA_1$ represents the data stored in the pixel $PIX_1$. $DA_2$ represents the data stored in the pixel $PIX_2$.

FIG. 6 shows the waveforms of the data-driving signals $V_{GJ}$ and $V_{G(J+1)}$, and the data $DA_1$ stored in the pixel $PIX_1$ and the data $DA_2$ stored in the pixel $PIX_2$ in an odd frame of the LCD panel 500. In FIG. 6, the data-driving circuit 120 writes data $DA_{INT1}$ into the pixels $PIX_1$ and $PIX_2$, and the data polarity of each pixel of the LCD panel 500 is positive in the odd frame of the LCD panel 500. In period $T_1$ of FIG. 6, when the data-driving circuit 120 writes the second data ($DA_{INT1}$) into the pixel $PIX_2$, the control circuit 535 controls the switch circuit 533 to switch the voltage level voltage of the voltage $V_1$ to ($V_{DC}$+$V_{CP}$), and controls the switch circuit 534 to switch the voltage level of the voltage $V_4$ to ($V_{SS}$+$V_{CP}$). In this way, all of the voltage levels of the gamma voltages $V_{A1P}$~$V_{AXP}$ and $V_{A1N}$~$V_{AXN}$ generated by the gamma voltage generator 530 increases by one compensating voltage level $V_{CP}$. Therefore, when the gate-driving circuit 110 drives the gate lines $G_J$ and $G_{(J+1)}$, the data-driving circuit 120 actually writes the second data ($DA_{INT1}$+$V_{CP}$) into the pixel $PIX_2$ according to the positive polarity gamma voltages $V_{A1P}$~$V_{AXP}$ compensated by the compensating voltage level $V_{CP}$. When the LCD panel 500 enters the period $T_2$, the gate-driving circuit 110 only drives the gate line $G_J$. The data ($DA_{INT}$+$V_{CP}$) stored in the pixel $PIX_2$ is affected by the falling edge of the voltage $V_{G(J+1)}$ through the parasitic capacitor of the transistor $Q_2$ so that the voltage level of the data ($DA_{INT}$+$V_{CP}$) stored in the pixel $PIX_2$ decreases by one feed-through voltage level $V_{FT}$. Since the compensating voltage level $V_{CP}$ is set to be equal to the feed-through voltage level $V_{FT}$, the data stored in the $PIX_2$ becomes $DA_{INT1}$ in the period $T_2$. In the period $T_2$ of FIG. 6, when the data-driving circuit 120 writes the first data ($DA_{INT1}$) into the pixel $PIX_1$, the control circuit 535 controls the switch circuit 533 to switch the voltage $V_1$ to the predetermined voltage level $V_{DC}$, and control the switch circuit 534 to switch the voltage $V_4$ to the predetermine low voltage level $V_{SS}$. In this way, the voltage levels of the gamma voltages $V_{A1P}$~$V_{AXP}$ and $V_{A1N}$~$V_{AXN}$ generated by the gamma voltage generator 530 are switched to be un-compensated voltage levels. As a result, the data-driving circuit 120 writes first data $DA_{INT1}$ into the pixel $PIX_1$ according to the un-compensated positive polarity gamma voltages $V_{A1P}$ $V_{AXP}$. When the period $T_2$ is over, the data $DA_{INT1}$ stored in the pixel $PIX_1$ is affected by the falling edge of the voltage $V_{GJ}$ so that the voltage level of the data $DA_{INT1}$ stored in the pixel $PIX_1$ decreases by one feed-through voltage level $V_{FT}$. In this way, the data stored in the pixel $PIX_1$ becomes $DA_{11}$. In addition, the data stored in the pixel $PIX_2$ is also affected by the falling edge of the voltage $V_{GJ}$ so that the voltage level of the data stored in the pixel $PIX_2$ decreases by one feed-through voltage level $V_{FT}$ again. Hence, the data stored in the pixel $PIX_2$ becomes $DA_{21}$.

FIG. 7 shows the waveforms of the data-driving signals $V_{GJ}$ and $V_{G(J+1)}$, and the data $DA_1$ stored in the pixel $PIX_1$ and the data $DA_2$ stored in the pixel $PIX_2$ in an even frame of the LCD panel 500. In the even frame of the LCD panel 500, the data polarity of each pixel is negative. In the period $T_1$ of FIG. 7, when the data-driving circuit 120 writes the data ($-DA_{INT2}$) into the pixel $PIX_2$, the control circuit 535 controls the switch circuit 533 to switch the voltage $V_1$ to ($V_{DC}$+$V_{CP}$), and controls the switch circuit 534 to switch the voltage $V_4$ to ($V_{SS}$+$V_{CP}$). In this way, all of the voltage levels of the gamma voltages $V_{A1P}$~$V_{AXP}$ and $V_{A1N}$~$V_{AXN}$ generated by the gamma voltage generator 530 increases by one compensating voltage level $V_{CP}$. Therefore, when the gate-driving circuit 110 drives the gate lines $G_J$ and $G_{(J+1)}$, the data-driving circuit 120 actually writes the data ($-DA_{INT2}$+$V_{CP}$) into the pixel $PIX_2$ according to the negative polarity gamma voltages $V_{A1N}$~$V_{AXN}$ compensated by the compensating voltage level $V_{CP}$. When the LCD panel 500 enters the period $T_2$, the gate-driving circuit 110 only drives the gate line $G_J$. The data ($-DA_{INT2}$+$V_{CP}$) stored in the pixel $PIX_2$ is affected by the falling edge of the voltage $V_{G(J+1)}$ through the parasitic capacitor of the transistor $Q_2$ so that the voltage level of the data ($-DA_{INT2}$+$V_{CP}$) stored in the pixel $PIX_2$ decreases by one feed-through voltage level $V_{FT}$. Since the compensating voltage level $V_{CP}$ is set to be equal to the feed-through voltage level $V_{FT}$, the data stored in the $PIX_2$ becomes ($-DA_{INT2}$) in the period $T_2$. In the period $T_2$ of FIG. 7, when the data-driving circuit 120 writes the data ($-DA_{INT2}$) into the pixel $PIX_1$, the control circuit 535 controls the switch circuit 533 to switch the voltage level of the voltage $V_1$ to the predetermined voltage level $V_{DC}$, and control the switch circuit 534 to switch the voltage level of the voltage $V_4$ to the predetermine low voltage level $V_{SS}$. In this way, the voltage levels of the gamma voltages $V_{A1P}$~$V_{AXP}$ and $V_{A1N}$~$V_{AXN}$ generated by the gamma voltage generator 530 are switched to be un-compensated voltage levels. As a result, the data-driving circuit 120 writes data ($-DA_{INT2}$) into the pixel $PIX_1$ according to the un-compensated negative polarity gamma voltages $V_{A1N}$~$V_{AXN}$. When the period $T_2$ is over, the data ($-DA_{INT2}$) stored in the pixel $PIX_1$ is affected by the falling edge of the voltage $V_{GJ}$ so that the voltage level of the data ($-DA_{INT2}$) stored in the pixel $PIX_1$ decreases by one feed-through voltage level $V_{FT}$. In this way, the data stored in the pixel $PIX_1$ becomes ($-DA_{12}$). In addition, the data stored in the pixel $PIX_2$ is also affected by the falling edge of the voltage $V_{GJ}$ so that the voltage level of the data stored in the pixel $PIX_2$ decreases by one feed-through voltage level $V_{FT}$ again. Hence, the data stored in the pixel $PIX_2$ becomes ($-DA_{22}$).

It can be seen according to the above illustration that in the odd frame shown in FIG. 6, the data $DA_{21}$ stored in the pixel $PIX_2$ and the data $DA_{11}$ stored in the pixel $PIX_1$ are both equal to ($DA_{INT1}$~$V_{FT}$), and in the even frame shown in FIG. 7, the data ($-DA_{22}$) stored in the pixel $PIX_2$ and the data ($-DA_{12}$) stored in the pixel $PIX_1$ are both equal to ($-DA_{INT2}$~$V_{FT}$). In other words, the feed-through effect suffered by the pixel $PIX_2$ can be compensated by means of the control circuit 535 controlling the switch circuits 533 and 534 to adjust the voltage levels of the gamma voltages $V_{A1P}$~$V_{AXP}$ and $V_{A1N}$~$V_{AXN}$. In addition, the polarity of the data ($DA_{INT1}$−$V_{FT}$) stored in the pixel $PIX_1$ (or $PIX_2$) in the odd frame can be set to be inverted to that of the data ($-DA_{INT2}$−$V_{FT}$) stored in the pixel $PIX_1$ (or $PIX_2$) in the even frame by properly setting the values of the data $DA_{INT1}$ and $DA_{INT2}$. In this way, the function of polarity inversion can be realized in the LCD panel 500, and each pixel in the LCD panel 500 can display with correct brightness.

In addition, in FIG. 6 and FIG. 7, it is assumed that the common voltage source $V_{COM}$ in the LCD panel 500 provides a DC common voltage. However, when the common voltage source $V_{COM}$ in the LCD panel 500 provides an AC common voltage, each pixel of the LCD panel 500 can still display with correct brightness by setting the predetermined voltage level $V_{DC}$ to be equal to the DC level of the AC common voltage. In this situation, the operational principle of the LCD panel 500 is similar to that illustrated in FIG. 6 and FIG. 7. In addition, in the above illustration, the type of the polarity inversion of the LCD panel 500 is set to be frame inversion for example. However, the type of the polarity inversion of the LCD panel 500 also can be column inversion, row inversion, dot inversion, or 2-dot inversion. No matter what the type of the polarity inversion of the LCD panel 500 is, the feed-through effect suffered by the pixel $PIX_2$ can be compensated by the control circuit 535 controlling the switch circuit 533 and 534 to adjust the voltage levels of the positive polarity gamma voltages $V_{A1P}$~$V_{AXP}$ and the negative polarity gamma voltages $V_{A1N}$~$V_{AXN}$. Consequently, no matter what the type of the polarity inversion of the LCD panel 500 is, each pixel in the LCD panel 500 displays with correct brightness, so that the LCD panel 500 can correctly display images.

Figure 8:
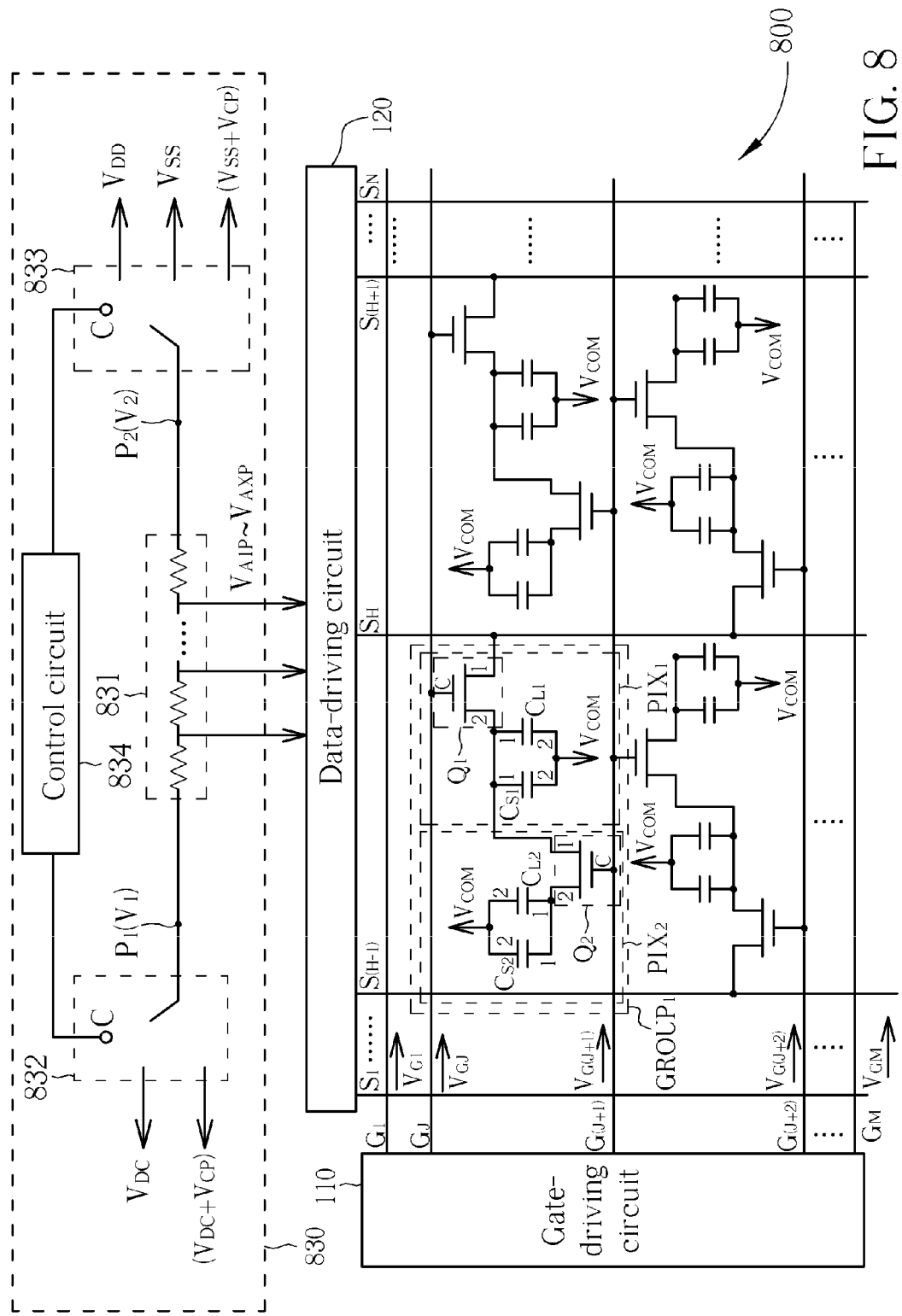
FIG. 8 is a diagram illustrating an LCD panel according to a second embodiment of the present invention.

Please refer to FIG. 8. FIG. 8 is a diagram illustrating an LCD panel 800 according to a second embodiment of the present invention. The LCD panel 800 includes plural groups of pixels, a gate-driving circuit 110, a data-driving circuit 120, and a gamma voltage generator 830. The structure and the driving method of the LCD panel 800 are similar to those of the LCD panel 500. Compared with the LCD panel 500, in the LCD panel 800, the gamma voltage generator 830 provides a group of gamma voltages $V_{A1}$~$V_{AX}$ to the data-driving circuit 130. The gamma voltage generator 830 includes a voltage-dividing circuit 831, switch circuits 832 and 833, and a control circuit 834. The voltage-dividing circuit 831 includes a plurality of resistor coupled in series between nodes $P_1$ and $P_2$. The voltage-dividing circuit 831 generates the gamma voltages $V_{A1}$~$V_{AX}$ according to a voltage $V_1$ on the node $P_1$ and a voltage $V_2$ on the node $P_2$. The voltage levels of the gamma voltages $V_{A1}$~$V_{AX}$ are between the voltage levels of the voltages $V_1$ and $V_2$. The switch circuit 832 is coupled to the node $P_1$. The control end C of the switch circuit 832 is coupled to the control circuit 834. The switch circuit 832 is utilized for switching the voltage $V_1$ to the predetermined voltage level $V_{DC}$ or the predetermined voltage level $V_{DC}$ plus one compensating voltage level $V_{CP}$. The switch circuit 833 is coupled to the node $P_2$. The control end C of the switch circuit 833 is coupled to the control circuit 834. The switch circuit 833 is utilized for switching the voltage $V_2$ to the predetermined high voltage level $V_{DD}$, the predetermined low voltage level $V_{SS}$, or the predetermined low voltage level $V_{SS}$ plus one compensating voltage level $V_{CP}$. Similarly, in the LCD panel 800, the compensating voltage level $V_{CP}$ is set to be equal to the feed-through voltage level $V_{FT}$, and the voltage difference between the predetermined high voltage level $V_{DD}$ and the predetermined voltage level $V_{DC}$ is set to be equal to the voltage difference between the predetermined voltage level $V_{DC}$ and the predetermined low voltage level $V_{SS}$. When the common voltage source $V_{COM}$ provides a DC common voltage, the predetermined voltage level $V_{DC}$ is set to be equal to the voltage level of the DC common voltage. When the common voltage source $V_{COM}$ provides an AC common voltage, the predetermined voltage level $V_{DC}$ is set to be equal to the DC level of the AC common voltage. In the LCD panel 800, the control circuit 834 controls the switch circuits 832 and 833 to adjust the voltage levels of the gamma voltages $V_{A1}$~$V_{AX}$ for the pixels $PIX_1$ and $PIX_2$ displaying with correct brightness. The related operational principle is further illustrated in the following description.

When the data-driving circuit 120 writes the first data into the pixel $PIX_1$, the control circuit 834 controls the switch circuit 832 to switch the voltage $V_1$ to be the predetermined voltage level $V_{DC}$, and controls the switch circuit 833 to switch the voltage $V_2$ to be the predetermined high voltage level $V_{DD}$ or the predetermined low voltage level $V_{SS}$ according to the polarity of the first data. More particularly, when the polarity of the first data is positive, the control circuit 834 controls the switch circuit 833 to switch the voltage level of the voltage $V_2$ to be the predetermined high voltage level $V_{DD}$. When the polarity of the first data is negative, the control circuit 834 controls the switch circuit 833 to switch the voltage level of the voltage $V_2$ to be the predetermined low voltage level $V_{SS}$.

When the data-driving circuit 120 writes the second data into the pixel $PIX_2$, the control circuit 834 controls the switch circuit 832 to switch the voltage $V_1$ to be the predetermined voltage level $V_{DC}$ or the predetermined voltage level $V_{DC}$ plus one compensating voltage level $V_{CP}$, and controls the switch circuit 833 to switch the voltage $V_2$ to be the predetermined high voltage level $V_{DD}$ or the predetermined low voltage level $V_{SS}$ plus one compensating voltage level $V_{CP}$ according to the polarity of the second data. When the polarity of the second data is positive, the control circuit 834 controls the switch circuit 833 to switch the voltage $V_2$ to be the predetermined voltage level $V_{DC}$ plus one compensating voltage level $V_{CP}$, and controls the switch circuit 833 to switch the voltage level of the voltage $V_2$ to be the predetermined high voltage level $V_{DD}$. When the polarity of the second data is negative, the control circuit 834 controls the switch circuit 832 to switch the voltage $V_1$ to be the predetermined voltage level $V_{DC}$, and controls the switch circuit 833 to switch the voltage $V_2$ to be the predetermined low voltage level $V_{SS}$ plus one compensating voltage level $V_{CP}$.

According to the above illustration, when the data-driving circuit 120 writes the first data into the pixel $PIX_1$, if the polarity of the first data is positive, the gamma voltage generator 830 provides the gamma voltages $V_{A1}$~$V_{AX}$ with voltage levels between $V_{DD}$ and $V_{DC}$; if the polarity of the first data is negative, the gamma voltage generator 830 provides the gamma voltages $V_{A1}$~$V_{AX}$ with voltage levels between $V_{DC}$ and $V_{SS}$. When the data-driving circuit 120 writes the second data into the pixel $PIX_2$, if the polarity of the second data is positive, the gamma voltage generator 830 provides the gamma voltages $V_{A1}$~$V_{AX}$ with voltage levels between $V_{DD}$ and $(V_{DC}+V_{CP})$; if the polarity of the second data is negative, the gamma voltage generator 830 provides the gamma voltages $V_{A1}$~$V_{AX}$ with voltage levels between $V_{DC}$ and $(V_{SS}+V_{CP})$. In other words, when the polarity of the first data (or the second data) is positive, the gamma voltages $V_{A1}$~$V_{AX}$ provided by the gamma voltage generator 830 are similar to the positive polarity gamma voltages $V_{A1P}$~$V_{AXP}$ provided by the gamma voltage generator 530; and when the polarity of the first data (or the second data) is negative, the gamma voltages $V_{A1}$~$V_{AX}$ provided by the gamma voltage generator 830 are similar to the negative polarity gamma voltages $V_{A1N}$~$V_{AXN}$ provided by the gamma voltage generator 530. In other words, the operation of the LCD panel 800 is similar to that of the LCD panel 500. For example, when the type of the polarity inversion of the LCD panel 800 is frame inversion, the waveforms of the data stored in the pixels $PIX_1$ and $PIX_2$ of the LCD panel 800 are similar to those shown in FIG. 6 and FIG. 7. Consequently, each pixel of the LCD panel 800 displays with correct brightness, so that the LCD panel can correctly display images.

In addition, the type of the polarity inversion of the LCD panel 800 also can be column inversion, row inversion, or dot inversion. When the type of the polarity inversion of the LCD panel 800 is column inversion, row inversion, or dot inversion, the operational principle of the LCD panel 800 is similar to that illustrated in the above description.

In conclusion, the LCD panel provided by the present invention includes plural groups of pixels, a gate-driving circuit, a data-driving circuit, and a gamma voltage generator. Each group of pixels includes a first pixel and a second pixel. The first pixel and the second pixel share one data line, and the second pixel is coupled to the data line through the first pixel. The first pixel and the second pixel are coupled to a first gate line and a second gate line, respectively. When the gate-driving circuit only drives the first gate line, the data-driving circuit writes data into the first pixel. When the gate-driving circuit drives the first gate line and the second gate line at the same time, the data-driving circuit writes data into the second pixel. In the LCD panel provided by the present invention, when the data-driving circuit writes data into the first pixel, the gamma voltage generator provides un-compensated gamma voltages to the data-driving circuit. When the data-driving circuit writes data into the second pixel, the gamma voltage generator provides the gamma voltages compensated by a compensating voltage level to the data-driving circuit. In this way, the feed-through effect suffered by the second pixel is compensated by compensating the voltage level of the data stored in the second pixel, so that the first pixel and the second pixel suffer the feed-through effect with the same degree. Hence, each pixel of the LCD panel provided by the present invention can display with correct brightness, so that the LCD panel provided by the present invention can correctly display images.

Those skilled in the art will readily observe that numerous modifications and alterations of the device and method may be made while retaining the teachings of the invention.

What is claimed is:

1. A liquid crystal display (LCD) panel with function of compensating feed-through effect, comprising:
- a plurality of groups of pixels, each group of pixels comprising:
  - a first pixel, comprising a first transistor, a first storage capacitor, and a first liquid capacitor, the first transistor having a first end coupled to a data line, a second end, and a control end coupled to a first gate line, the first storage capacitor and the first liquid capacitor being coupled between a common voltage source and the second end of the first transistor; and
  - a second pixel, comprising a second transistor, a second storage capacitor, and a second liquid capacitor, the second transistor having a first end coupled to the second end of the first transistor, a second end, and a control end coupled to a second gate line, the second storage capacitor and the second liquid capacitor being coupled between the common voltage source and the second end of the second transistor;
- a gate-driving circuit, for driving the first gate line and the second gate line;
- a data-driving circuit, for writing a first data into the first pixel through the data line and the first transistor when the gate-driving circuit drives the first gate line, and writing a second data into the second pixel through the data line, the first transistor, and the second transistor when the gate-driving circuit drives the first gate line and the second gate line; and
- a gamma voltage generator, for providing a first group of gamma voltages to the data-driving circuit, the gamma voltage generator comprising:
  - a first voltage-dividing circuit, coupled between a first node and a second node, for generating the first group of gamma voltages according to a first voltage on the first node and a second voltage on the second node, voltage levels of the first group of gamma voltages being between voltage levels of the first voltage and the second voltage;
  - a first switch circuit, coupled to the first node;
  - a second switch circuit, coupled to the second node; and
  - a control circuit, for controlling the first switch circuit to switch the first voltage to a first predetermined voltage level and controlling the second switch circuit to switch the second voltage to a predetermined high voltage level or a predetermined low voltage level according to a polarity of the first data when the data-driving circuit writes the first data, and for controlling the first switch circuit to switch the first voltage to the first predetermined voltage level plus a compensating voltage level and controlling the second switch circuit to switch the second voltage to the predetermined high voltage level when the data-driving circuit writes the second data and a polarity of the second data is positive.

2. The liquid crystal display panel of claim 1, wherein a type of polarity inversion of the liquid crystal display panel is a column inversion, a row inversion, a frame inversion, or a dot inversion.

3. The liquid crystal display panel of claim 1, wherein when the common voltage source provides a DC common voltage, the first predetermined voltage level is equal to a voltage level of the DC common voltage, and a voltage difference between the predetermined high voltage level and the first predetermined voltage level is equal to a voltage difference between the first predetermined voltage level and the predetermined low voltage level.

4. The liquid crystal display panel of claim 1, wherein when the common voltage source provides an AC common voltage, the first predetermined voltage level is equal to a DC level of the AC common voltage, and a voltage difference between the predetermined high voltage level and the first predetermined voltage level is equal to a voltage difference between the first predetermined voltage level and the predetermined low voltage level.

5. The liquid crystal display panel of claim 1, wherein when the polarity of the first data is positive, the control circuit controls the second switch circuit to switch the voltage level of the second voltage to the predetermined high voltage level; and when the polarity of the first data is negative, the control circuit controls the second switch circuit to switch the voltage level of the second voltage to the predetermined low voltage level.

6. The liquid crystal display panel of claim 1, wherein when the polarity of the second data is negative, the control circuit controls the first switch circuit to switch the voltage level of the first voltage to the first predetermined voltage level, and controls the second switch circuit to switch the voltage level of the second voltage to the predetermined low voltage level plus the compensating voltage level.

7. The liquid crystal display panel of claim 1, wherein the first voltage-dividing circuit comprises a plurality of resistors coupled in series.

* * * * *